United States Patent [19]

Gardiner

[11] Patent Number: 4,840,743

[45] Date of Patent: Jun. 20, 1989

[54] LIQUID ORGANOPOLYSILOXANE COMPOSITIONS

[75] Inventor: William Gardiner, Penarth, Wales

[73] Assignee: Dow Corning, Ltd., Barry, Wales

[21] Appl. No.: 179,463

[22] Filed: Apr. 7, 1988

[30] Foreign Application Priority Data

Apr. 24, 1987 [GB] United Kingdom ............. 8709745

[51] Int. Cl.$^4$ ........................................... C10M 105/76
[52] U.S. Cl. ............................. 252/49.6; 123/41.49; 123/41.11; 123/41.12; 192/30 R; 192/31; 192/113 R; 192/113 B
[58] Field of Search ............... 252/49.6, 49.7; 528/10; 192/113 R, 113 B; 123/41.49, 41.11

[56] References Cited

U.S. PATENT DOCUMENTS 3,328,350 6/1967 Omietanski et al. ............. 260/46.5
4,537,691 8/1985 Mori et al. ......................... 252/49.6

FOREIGN PATENT DOCUMENTS 0191456 8/1986 European Pat. Off. .

Primary Examiner—William R. Dixon
Assistant Examiner—James M. Hunter, Jr.
Attorney, Agent, or Firm—Alexander Weitz

[57] ABSTRACT

An organopolysiloxane composition comprising (1) a polydiorganosiloxane, (2) an organosiloxane having at least one silicon-bonded group selected from anilinophenoxy and naphthylaminophenoxy groups and (3) a siloxy metal compound wherein the metal is Ti, Zr or Hf, or a zirconium salt of a monocarboxylic acid.

The compositions are stabilized against high temperature oxidative degeneration and are useful inter alia as viscous coupling fluids for automobile fan clutches.

6 Claims, No Drawings

LIQUID ORGANOPOLYSILOXANE COMPOSITIONS

This invention relates to liquid organosiloxane compositions and is particularly concerned with such compositions which exhibit reduced variation of viscosity with time and temperature.

The use of liquid organosiloxanes as lubricants, heat transfer fluids and viscous coupling fluids is known. In order to function satisfactorily in the latter application the fluid should possess certain properties, in particular stability against oxidation and little or no variation of viscosity throughout the range of operating temperatures and during its intended operating life. Most commonly employed in such applications are the liquid polydimethylsiloxanes. However, if employed alone at high operating temperatures the polydimethylsiloxanes can exhibit an increase in viscosity and subsequent gelation. Such increase in viscosity can be delayed by the addition of certain antioxidants. For example in U.S. Pat. No. 3,328,350 it is disclosed that the addition of e.g. the reaction product of an organosiloxane and p-anilinophenol to fluid polydimethylsiloxanes can improve their stability against oxidative degradation. U.S. Pat. No. 4,537,691 discloses a novel silicone fluid composition usable as a working fluid at high temperatures which comprises a mixture of a diorganopolysiloxane having both trihydrocarbylsiloxy groups and hydroxy groups with siloxanes having certain aminoaryl, e.g. anilinophenoxy, substituents.

European Patent Application No. 191 456 describes a further development in the art and is concerned with organopolysiloxane viscous coupler fluids comprising a mixture of an organopolysiloxane fluid, a zirconium-containing organosiloxane compound and a cerium-containing organosiloxane compound.

Although the known prior art fluids perform satisfactorily as fan clutch liquids under normal operating conditions the advent of higher performance automotive engines has demanded liquids having even greater resistance to oxidative degradation and viscosity change.

SUMMARY OF THE INVENTION

According to the present invention there is provided an organopolysiloxane composition comprising (1) 100 parts by weight of a liquid polydiorganosiloxane wherein at least 70 percent of the total organic substituents are methyl groups, any remaining organic substituents being selected from alkyl groups having from 2 to 14 inclusive carbon atoms and phenyl groups, (2) from 0.01 to 7.5 parts by weight of an organosiloxane having at least one silicon-bonded group selected from anilinophenoxy and naphthylaminophenoxy groups and (3) a metal compound which is selected from (i) siloxy metal compounds having in the molecule at least one metal atom selected from titanium, zirconium and hafnium atoms attached to silicon via a TiOSi, ZrOSi or HfOSi linkage, and (ii) zirconium salts of monocarboxylic acids, there being sufficient of the metal compound present to provide from 0.001 to 0.25 part by weight of metal.

DETAILED DESCRIPTION OF THE INVENTION

The polydiorganosiloxanes (1) of the compositions of this invention may be represented by the average unit general formula $R_nSiO_{4-n/2}$, wherein R represents the organo substituents attached to silicon and n has a value of from about 1.85 to about 2.15, preferably from 1.99 to 2.01. The polydiorganosiloxanes are thus predominantly linear in character but may contain relatively small proportions of chain branching ($RSiO_{3/2}$) units. End-blocking units $R_3SiO_{\frac{1}{2}}$ are preferably present but polydiorganosiloxanes in which such units are absent are also operative. Thus the polydiorganosiloxane may be terminated with for example $\equiv$SiOH or $\equiv$SiOR groups.

At least 70 percent of the total R groups are methyl groups. Any remaining R groups may be, for example, ethyl, butyl, trimethylpentyl, dodecyl or phenyl. Examples of polydiorganosiloxanes (1) therefore are trimethylsilyl end-blocked polydimethylsiloxanes, dimethylphenylsilyl end-blocked polydimethylsiloxanes, trimethylsilyl end-stopped copolymers of dimethylsiloxane and phenylmethylsiloxane units and hydroxyl-terminated polydimethylsiloxanes. Polydiorganosiloxane (1) may consist of a single siloxane polymer or a mixture of siloxane polymers having different substituents, structures or viscosities. Preferred for use according to this invention are polydiorganosiloxanes which consist of a mixture of from about 70 to 95 parts by weight of a polydimethylsiloxane and from 5 to 30 parts by weight of a polymethylphenylsiloxane or a copolymer of dimethylsiloxane and methylphenylsiloxane.

The viscosity of polydiorganosiloxane (1) can vary within wide limits e.g. from 0.0005 to 0.1 m²/s at 25° C. provided it is liquid at 25° C. Generally the particular viscosity will be chosen having regard to the requirements of the intended application. When required for use in viscous coupling, such as in automobile fan clutches, a viscosity in the range from 0.001 to 0.05 m²/s is preferred.

Component (2) of the compositions of this invention is an organosiloxane having at least one silicon-bonded group selected from anilinophenoxy and naphthylaminophenoxy groups. The remaining substituents attached to silicon are selected from alkyl groups e.g. methyl, ethyl, isopropyl and phenyl groups, organosiloxanes wherein the remaining substituents are substantially all methyl groups being preferred. The organosiloxane (2) is also preferably a substantially linear polydiorganosiloxane.

At least one $C_6H_5NHC_6H_4O-$ and/or $C_{10}H_6NHC_6H_4O-$ group should be present in (2). Such groups may be pendant from silicon atoms along the siloxane chain, attached to a terminal silicon atom or both. Organosiloxanes (2) may be homopolymers or copolymers. They are known substances and can be prepared by the reaction of acyloxy siloxanes and the appropriate phenol, e.g. p-anilinophenol, as described in U.S. Pat. No. 3,328,350. Another method of preparing such organosiloxanes comprises reacting the phenol with an organosiloxane having silicon-bonded chlorine atoms in the presence of an acceptor for the by-product HCl. The proportion of (2) employed in the compositions of this invention will depend largely upon the magnitude of the desired effect and the proportion of the specified aminophenoxy substituents in the molecule relative to the remaining substituents. At least 0.01 and up to 7.5 parts per 100 parts of (1) can be employed, from 0.1 to 2.5 parts generally being preferred.

Component (3) of the compositions of this invention is (i) a siloxy metal compound in which the metal is Zr, Ti or Hf and in which the metal atom is joined to a silicon through an oxygen atom, or (ii) a zirconium salt of a monocarboxylic acid or both (i) and (ii).

The siloxy metal compounds (i) are organosilicon compounds, e.g. organosilanes and organosiloxanes, having at least one ZrOSi, TiOSi HfOSi bond per molecule. The remaining valencies of the silicon atoms may be satisfied by other metal-oxygen linkages, by monovalent hydrocarbon groups, for example methyl, ethyl, propyl, octyl, vinyl, phenyl or benzyl, or by divalent oxygen atoms linked in turn to other silicon atoms to form siloxane —SiOSi— linkages. Any valencies of the Zr, Ti or Hf atoms which are not satisfied by siloxy groups are satisfied by oxygen-bonded organic groups for example alkoxy groups e.g. methoxy, ethoxy, butoxy and decoxy, aryloxy e.g. phenoxy, acyloxy groups e.g. acetoxy, propionoxy and octanoxy, and chelating groups such as ethylacetoacetate and acetylacetonate. Thus one type of siloxy metal compound (i) is that which may be exemplified by the general formula

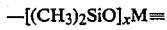
$$-[(CH_3)_2SiO]_xM\equiv$$

in which M represents Zr, Ti or Hf, and the remaining valencies of M are satisfied by other siloxy e.g. —(CH$_3$)$_2$SiO— groups, or by oxygen linked organic groups as specified above. Another type of siloxy metal compound may be exemplified by the compound [(CH$_3$)$_3$SiO]$_4$M.

The metal siloxy compounds are known substances and can be prepared, for example, by heating a mixture of a polydimethylsiloxane and an organometal compound having metal-oxygen-carbon linkages. Alternatively they can be prepared by reacting the metal alkoxide with a silanol-terminated organosiloxane or by reacting the metal halide with an alkali metal silanolate.

It is generally preferred to use as Component (3) of the compositions of this invention the siloxy metal compounds (i), particularly organosiloxanes wherein at least 80 percent of the total silicon-bonded organic groups are methyl. Such organosiloxanes are more soluble in the polydiorganosiloxane (1), and thus more readily dispersed therein. However, the zirconium carboxylates, for example zirconium acetate, zirconium butyrate and zirconium octoate may also be employed in place of, or in combination with, the siloxy metal compound.

Sufficient of Component (3) should be present to provide from 0.001 to 0.25 parts, preferably 0.005 to 0.1 part by weight of metal per 100 parts by weight of the polydiorganosiloxane (1).

The compositions of this invention can be prepared by simply mixing Components (1), (2) and (3) in any order. Usually, however, the most convenient method is to add (2) and (3) to (1).

The compositions comprising (1), (2) and (3) are resistant to degradation under conditions of high shear at elevated temperatures. They are thus particularly useful as viscous coupling fluids, for example in automobile fan clutches, where retention of a stable working viscosity over prolonged periods is required.

The following Example in which all parts are expressed by weight illustrates the invention.

To 89 parts of a trimethylsilyl-end stopped polydimethylsiloxane having a viscosity of $9\times10^{-3}$ m$^2$/s (9000cS) at 25° C. were added 9.9 parts of a trimethylsilyl-end stopped copolymer of 90% dimethylsiloxane units and 10% methylphenylsiloxane units having a viscosity of $10^{-4}$ m$^2$/s (100cS) at 25° C. To this mixture was then added, with stirring, 0.5 part of a polydimethylsiloxane having a p-anilinophenoxy group attached to each of its terminal silicon atoms and a molecular weight of approximately 2,000, followed by 0.6 part of zirconium-containing methylsiloxane containing 3% by weight of zirconium and obtained by heating together a polydimethylsiloxane and zirconium octoate. Stirring was continued until the mixture became homogenous.

The mixture obtained above exhibited stability of its working viscosity over a long period when employed as a viscous coupling fluid in the fan clutch of a high performance automobile engine.

Four organosiloxane mixtures A, B, C and D were prepared as described hereinabove containing respectively 0, 0.6, 1.0 and 2.0 parts of the zirconium-containing methylsiloxane. Each mixture was then subjected to Thermogravimetric analysis employing a Perkin Elmer TCS-2 Thermogravimetric Analyser the temperature being increased at a rate of 30° C. per minute. For Sample A the onset of rapid weight loss (indicating polymer degradation) commenced at 492° C., total loss of weight of the sample occurring at about 650° C. In the cases of Samples, B, C and D the onset of rapid weight loss did not occur until the temperature had reached approximately 600° C. and total disappearance of the samples (100% loss of weight) occurred at temperatures from about 700° to 750° C.

That which is claimed is:

1. An organopolysiloxane composition consisting essentially of (1) 100 parts by weight of a liquid polydiorganosiloxane wherein at least 70 percent of the total organic substituents are methyl groups, any remaining organic substituents being selected from the group consisting of alkyl groups having from 2 to 14 inclusive carbon atoms and phenyl groups, (2) from 0.01 to 7.5 parts by weight of an organosiloxane having at least one silicon-bonded group selected from the group consisting of anilinophenoxy and naphthylaminophenoxy groups and (3) a metal compound which is selected from the group consisting of (i) siloxy metal compounds having in the molecule at least one metal atom selected from the group consisting of titanium, zirconium and hafnium atoms attached to silicon via a TiOSi, ZrOSi or HfOSi linkage, and (ii) zirconium salts of monocarboxylic acids, there being sufficient of the metal compound present to provide from 0.001 to 0.25 part by weight of metal.

2. A composition as claimed in claim 1 wherein the liquid polydiorganosiloxane (1) consists essentially of 70 to 95 parts by weight of a polydimethylsiloxane and 5 to 30 parts by weight of a phenyl-containing siloxane selected from the group consisting of polymethylphenylsiloxanes and copolymers of dimethylsiloxane and methylphenylsiloxane.

3. A composition as claimed in claim 2 wherein the polydiorganosiloxane (1) has a viscosity within the range from 0.001 to 0.05 m$^2$/s.

4. A composition as claimed in claim 1 wherein the siloxy metal compound is an organosiloxane in which at least 80 percent of the total silicon-bonded organic groups are methyl.

5. A composition as claimed in claim 1 wherein organosiloxane (2) is present in an amount of from 0.1 to 2.5 parts by weight.

6. In an automobile fan clutch containing a viscous coupling fluid, the improvement comprising using as said coupling fluid a composition consisting essentially of (1) 100 parts by weight of a liquid polydiorganosiloxane wherein at least 70 percent of the total organic substituents are methyl groups, any remaining organic substituents being selected from the group consisting of alkyl groups having from 2 to 14 inclusive carbon atoms and phenyl groups, (2) from 0.01 to 7.5 parts by weight of an organosiloxane having at least one silicon-bonded group selected from the group consisting of anilinophenoxy and naphthylaminophenoxy groups and (3) a metal compound which is selected from the group consisting of (i) siloxy metal compounds having in the molecule at least one metal atom selected from the group consisting of titanium, zirconium and hafnium atoms attached to silicon via a TiOSi, ZrOSi or HfOSi linkage, and (ii) zirconium salts of monocarboxylic acids, there being sufficient of the metal compound present to provide from 0.001 to 0.25 part by weight of metal.

* * * * *